United States Patent
Peck, Jr. et al.

(10) Patent No.: US 10,177,641 B2
(45) Date of Patent: Jan. 8, 2019

(54) STATOR ASSEMBLY INCLUDING STATOR ELEMENTS WITH SLOTTED STATOR CORES FOR USE IN AN ELECTRICAL MOTOR

(71) Applicant: THE BOEING COMPANY, Chicago, IL (US)

(72) Inventors: James L. Peck, Jr., Huntington Beach, CA (US); Robert J. Atmur, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 48 days.

(21) Appl. No.: 15/219,507

(22) Filed: Jul. 26, 2016

(65) Prior Publication Data

US 2018/0034355 A1 Feb. 1, 2018

(51) Int. Cl.

| H02K 41/06 | (2006.01) |
|---|---|
| H02K 1/14 | (2006.01) |
| H02K 7/00 | (2006.01) |
| H02K 7/116 | (2006.01) |
| H02K 37/08 | (2006.01) |
| H02P 8/00 | (2006.01) |

(52) U.S. Cl.
CPC ............. *H02K 41/065* (2013.01); *H02K 1/14* (2013.01); *H02K 1/141* (2013.01); *H02K 7/003* (2013.01); *H02K 7/1163* (2013.01); *H02K 37/08* (2013.01); *H02P 8/00* (2013.01)

(58) Field of Classification Search
USPC .... 318/696, 400.41, 538; 310/76, 77, 92, 93
See application file for complete search history.

(56) References Cited

U.S. PATENT DOCUMENTS

| 3,474,272 A * | 10/1969 | Newell ................ | H02K 41/065 |
|---|---|---|---|
| | | | 310/180 |
| 3,644,764 A | 2/1972 | Newell | |
| 7,148,590 B1 * | 12/2006 | Lampson ............... | H02K 41/03 |
| | | | 310/12.18 |

(Continued)

OTHER PUBLICATIONS

European Patent Office; Extended European Search Report for European Patent Application No. 17182867.6 dated Dec. 22, 2017, 12 Pages.

(Continued)

*Primary Examiner* — Jorge L Carrasquillo
(74) *Attorney, Agent, or Firm* — Moore & Van Allen PLLC; Charles L. Moore

(57) ABSTRACT

A stator assembly for an electric motor includes a drive plate, a first magnetic core and a second magnetic core. A first core slot is formed in the first magnetic core and a second slot is formed in the second magnetic core. The first and second magnetic cores each include two elongated members joined at one end by a base member which are defined by the respective core slots. The two elongated members extend from the base member substantially parallel to each other toward the drive plate. A stator coil is wound through the first core slot and the second core slot. An electrical current flowing in the stator coil generates a magnetic field about the stator coil that is absorbed by the first magnetic core and the second magnetic core to generate a magnetic flux in each of the magnetic cores that magnetically attracts the drive plate.

20 Claims, 10 Drawing Sheets

(56) References Cited

U.S. PATENT DOCUMENTS

| | | | | |
|---|---|---|---|---|
| 7,652,402 B2* | 1/2010 | Kinoshita | ................ | H02K 3/50 |
| | | | | 310/55 |
| 9,124,150 B2 | 9/2015 | Atmur | | |
| 9,159,487 B2* | 10/2015 | Peck | .................... | H01F 27/306 |
| 9,653,967 B2* | 5/2017 | Maynez | .................... | H02K 9/06 |
| 2004/0239466 A1* | 12/2004 | Rouser | ................... | H01F 27/26 |
| | | | | 336/200 |
| 2005/0093393 A1* | 5/2005 | Hirzel | ...................... | H02K 3/12 |
| | | | | 310/268 |
| 2012/0169174 A1 | 7/2012 | Radov et al. | | |
| 2013/0300242 A1* | 11/2013 | Yamada | ............... | H02K 21/044 |
| | | | | 310/156.08 |
| 2014/0285072 A1* | 9/2014 | Atmur | .................. | H02K 41/065 |
| | | | | 310/75 R |
| 2015/0015174 A1* | 1/2015 | Atmur | .................... | G05D 3/12 |
| | | | | 318/564 |

OTHER PUBLICATIONS

European Patent Office; Office Action for European Patent Application No. 17182867.6 dated Sep. 3, 2018, 9 Pages.

\* cited by examiner

STATOR ASSEMBLY INCLUDING STATOR ELEMENTS WITH SLOTTED STATOR CORES FOR USE IN AN ELECTRICAL MOTOR

CROSS-REFERENCE TO RELATED APPLICATIONS

This application is related to U.S. application Ser. No. 13/941,401, filed Jul. 12, 2013, now U.S. Pat. No. 9,124,150, which is assigned to the same assignee as the present application and is incorporated herein by reference.

This application is also related to U.S. application Ser. No. 13/553,267, filed Jul. 19, 2012, now U.S. Pat. No. 9,159,487, which is assigned to the same assignee as the present application and in incorporated herein by reference.

FIELD

The present disclosure relates to electric motors, and more particularly to a stator assembly including stator elements with slotted stator cores for use in an electrical motor.

BACKGROUND

Electromechanical actuators for primary flight control surfaces in aircraft, such as large commercial aircraft, include complex mechanical couplings in order to provide redundancy. These couplings are heavy and introduce additional failure modes and complex critical assembly tolerance constraints. Typically systems use speed summing of two independent motors. This requires that each motor has a brake and is connected to a differential which allows one motor to drive the load and, under a failure condition, to have its brake applied to allow the other motor to operate. This is a complex mechanical system that includes multiple gear meshes and bearing supports. This precision machine may have lower efficiency reducing the system performance. The brake is additionally a potential failure point and reduces the reliability of the system.

An electric motor controlled actuator which does not require motor redundancy, speed summing or brake systems to operate in a failure tolerant mode is desirable. Additionally, increasing the torque of the electric motor without increasing the current applied to each stator core element is also desirable.

SUMMARY

In accordance with an embodiment, a stator assembly for an electric motor includes a drive plate and a first magnetic core in which a first magnetic flux is generable. A first core slot is formed in the first magnetic core. The first magnetic core includes two elongated members joined at one end by a base member. The two elongated members and the base member are defined by the first core slot. The two elongated members extend from the base member substantially parallel to each other toward the drive plate. The stator assembly also includes a second magnetic core in which a second magnetic flux is generable. A second core slot is formed in the second magnetic core. The second magnetic core includes two elongated members joined at one end by a base member. The two elongated members and the base member are defined by the second core slot. The two elongated members extend from the base member substantially parallel to each other toward the drive plate. The stator assembly further includes a stator coil wound through the first core slot and the second core slot. An electrical current flowing in the stator coil generates a magnetic field about the stator coil that is absorbed by the first magnetic core and the second magnetic core to generate the first magnetic flux and the second magnetic flux that magnetically attract the drive plate.

In accordance with another embodiment, an electric motor includes a drive plate comprising a plurality of core segments. A fulcrum supports the drive plate for nutating motion of the drive plate. The electric motor also includes a stator assembly comprising a plurality of stator coil elements. Each stator coil element is associated with a respective one of the plurality of core segments. Each stator coil element includes a first magnetic core in which a first magnetic flux is generable. A first core slot is formed in the first magnetic core. The first magnetic core includes two elongated members joined at one end by a base member. The two elongated members and the base member are defined by the first core slot. The two elongated members extend from the base member substantially parallel to each other toward the drive plate. Each stator coil also includes a second magnetic core in which a second magnetic flux is generable. A second core slot is formed in the second magnetic core. The second magnetic core includes two elongated members joined at one end by a base member. The two elongated members and the base member are defined by the second core slot. The two elongated members of the second magnetic core extend from the base member substantially parallel to each other toward the drive plate. Each stator coil element additionally includes a stator coil wound through the first core slot and the second core slot. An electrical current flowing in the stator coil generates a magnetic field about the stator coil that is absorbed by the first magnetic core and the second magnetic core to generate the first magnetic flux and the second magnetic flux that magnetically attract the drive plate.

In accordance with a further embodiment, a method for controlling an actuator includes receiving a position command and determining a wobble angle of a drive plate mounted on a fulcrum. The method also includes sequentially controlling current to a plurality of stator coil elements to attract associated core segments in the drive plate inducing nutation of the drive plate to achieve a wobble angle consistent with the received position command. Each of the plurality of stator coil elements includes a first magnetic core in which a first magnetic flux is generable. A first core slot is formed in the first magnetic core. The first magnetic core includes two elongated members joined at one end by a base member. The two elongated members and the base member are defined by the first core slot. The two elongated members extend from the base member substantially parallel to each other toward the drive plate. Each of stator coil elements also includes a second magnetic core in which a second magnetic flux is generable. A second core slot is formed in the second magnetic core. The second magnetic core includes two elongated members joined at one end by a base member. The two elongated members and the base member are defined by the second core slot. The two elongated members extend from the base member substantially parallel to each other toward the drive plate. Each stator core elements additionally includes a stator coil wound through the first core slot and the second core slot. An electrical current flowing in the stator coil generates a magnetic field about the stator coil that is absorbed by the first magnetic core and the second magnetic core to generate the first magnetic flux and the second magnetic flux that magnetically attract the drive plate.

In accordance with another embodiment or any of the previous embodiments, the associated core segment of the drive plate form a magnetic flux path with the first magnetic core and the second magnetic core of an associated stator coil element in response to the associated core segment contacting the elongated members of the first magnetic core and the second magnetic core.

In accordance with another embodiment or any of the previous embodiments, the associated core segment of the drive plate is disposed at distance from the first magnetic core and the second magnetic core of the associated stator core element in response to the electrical current being removed from the stator coil of the associated stator core element and the electrical current being applied to another stator coil of the plurality of stator coil elements.

In accordance with another embodiment or any of the previous embodiments, the first magnetic core and the second magnetic core of each stator core element abut one another along a respective one of the elongated members of each of the first magnetic core and the second magnetic core.

In accordance with another embodiment or any of the previous embodiments, the first magnetic core and the second magnetic core are integrally formed by joining abutting elongated members of the first magnetic core and the second magnetic core.

In accordance with another embodiment or any of the previous embodiments, the first magnetic core and the second magnetic core each comprise a plurality of plates or laminates stacked directly on one another. Each plate or laminate includes two elongated segments joined at one end by a base segment. The plates or laminates form the two elongated members and the base member of each of the first magnetic core and the second magnetic core when stacked directly on one another.

In accordance with another embodiment or any of the previous embodiments, the electric motor further includes a stator case. The stator case is cylindrically shaped and the plurality of stator elements are disposed circumferentially within the stator case.

In accordance with another embodiment or any of the previous embodiments, each stator element comprises a substantially trapezoidal shape within the stator case and the second magnetic core comprises a fewer number of plates than the first magnetic core and is shorter on opposite ends than the first magnetic core.

In accordance with another embodiment or any of the previous embodiments, the electric motor further comprises a controller that provides independent control to each stator coil element for activation responsive to a received position command and a received wobble angle input. The plurality of stator coil elements operating a pure torque sum configuration upon the drive plate.

In accordance with another embodiment or any of the previous embodiments, the controller controls activation of the stator coil elements to position an aerodynamic surface of an aircraft.

In accordance with another embodiment or any of the previous embodiments, the drive plate includes an outer pericyclic gear and an inner pericyclic gear and the electric motor further includes a reaction plate including a reaction pericyclic gear configured for mating engagement of the outer pericyclic gear and a drive plate including a drive pericyclic gear is configured for mating engagement of the inner pericyclic gear.

DETAILED DESCRIPTION

Figure 1:
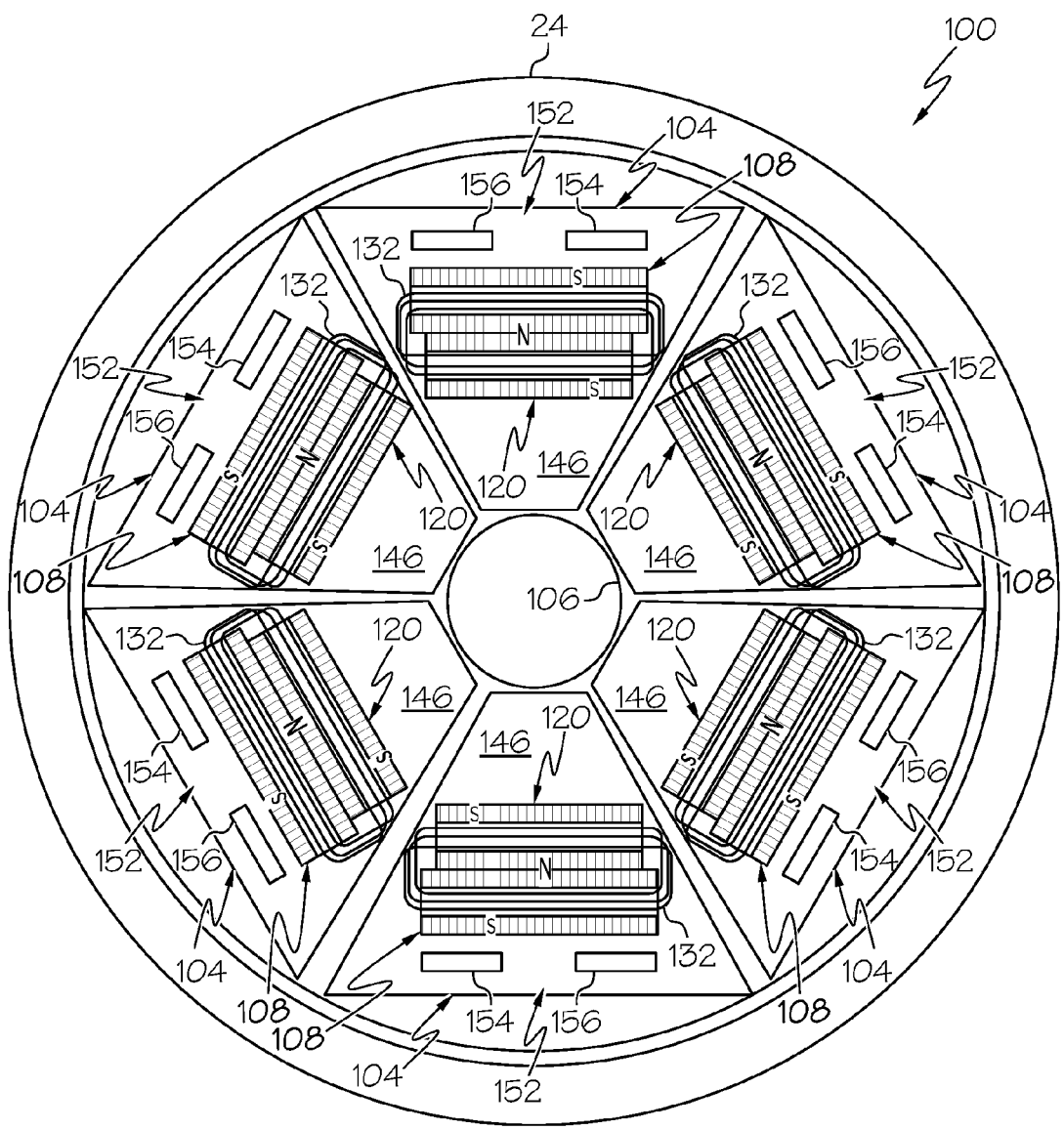
FIG. 1 is a top view of an example of a stator assembly for an electric motor in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Certain terminology is used herein for convenience only and is not to be taken as a limitation on the embodiments described. For example, words such as "proximal", "distal", "top", "bottom", "upper," "lower," "left," "right," "horizontal," "vertical," "upward," and "downward", etc., merely describe the configuration shown in the figures or relative positions used with reference to the orientation of the figures being described. Because components of embodiments can be positioned in a number of different orientations, the directional terminology is used for purposes of illustration and is in no way limiting. Based on the disclosure herein, it is to be understood that other embodiments may be utilized and structural or logical changes may be made without departing from the scope of the present disclosure. The following detailed description, therefore, is not to be taken in a limiting sense, and the scope of the present disclosure is defined by the appended claims.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments disclosed herein provide an actuator employing an electric motor or virtual elliptical electric motor with more than three coil segments acting independently but all operating on the same output plate in a pure torque sum instead of a speed summing operation. If any stator coil fails, or the controller for a stator coil fails disabling a stator coil, the sum of the torque is reduced but increased torque command to remaining stator coils accommodates the absence of torque from the failed stator coil. A failed stator coil or its controller has no impact to the electric motor operation due to a pure torque sum operation of the stator coils and no transition time is required to bring the system on-line after a fault occurs.

Conventional stator designs for an electric motor consist of a magnetic force generating assembly that allows magnetic flux leakage. Embodiments of the present disclosure include a modified stator and coil assembly that enhances the magnetic force developed by the stator and coil assembly by containing the magnetic flux flow within the magnetic core of the stator and coil assembly. Because the magnetic flux flow is contained within the magnetic core of the stator and coil assembly, the exemplary stator and coil assemblies of the present disclosure provide increased magnetic pull, reduced eddy currents within the core which allows for increased torque performance without increasing an amount of current applied to a winding or stator coil of a stator assembly.

FIG. 1 is a top view of an embodiment of a stator assembly 100 for an electric motor in accordance with an embodiment of the present disclosure. In accordance with an embodiment, the exemplary stator assembly 100 is used for the stator assembly 100 of an electric motor 102 (FIGS. 5-8). The electric motor 102 is configured as an actuator 14 in the exemplary embodiment described with reference to FIGS. 5-8 although other applications and embodiments of the exemplary stator assembly 100 and electric motor 102 will be apparent to those skilled in the art. The electric motor 102 includes a drive plate 28 (FIGS. 3A, 3B, 7 and 8). The drive plate 28 includes a plurality of core segments 30 (FIG. 7). A fulcrum 56 (FIG. 7) supports the drive plate 28 for nutating motion of the drive plate 28 as illustrated in FIGS. 9A and 9B.

Referring back to FIG. 1, the exemplary stator assembly 100 includes a stator case 24 and a plurality of stator coil elements 104 disposed in the stator case 24. Each stator coil element 104 is associated with a respective one of the plurality of core segments 30 of the drive plate 28. The stator case 24 is substantially cylindrically shaped and the plurality of stator coil elements 104 are disposed circumferentially within the stator case 24 about a center opening 106 through which the fulcrum 56 extends to support the drive plate 28 for nutating motion as described herein. The shape of the stator case 24 may be a different geometry, such as for example multi-sided, depending on the number of stator elements 104 and arrangement of the stator coil elements 104 may be different depending upon the application and configuration of the electric motor 102.

Figure 2:
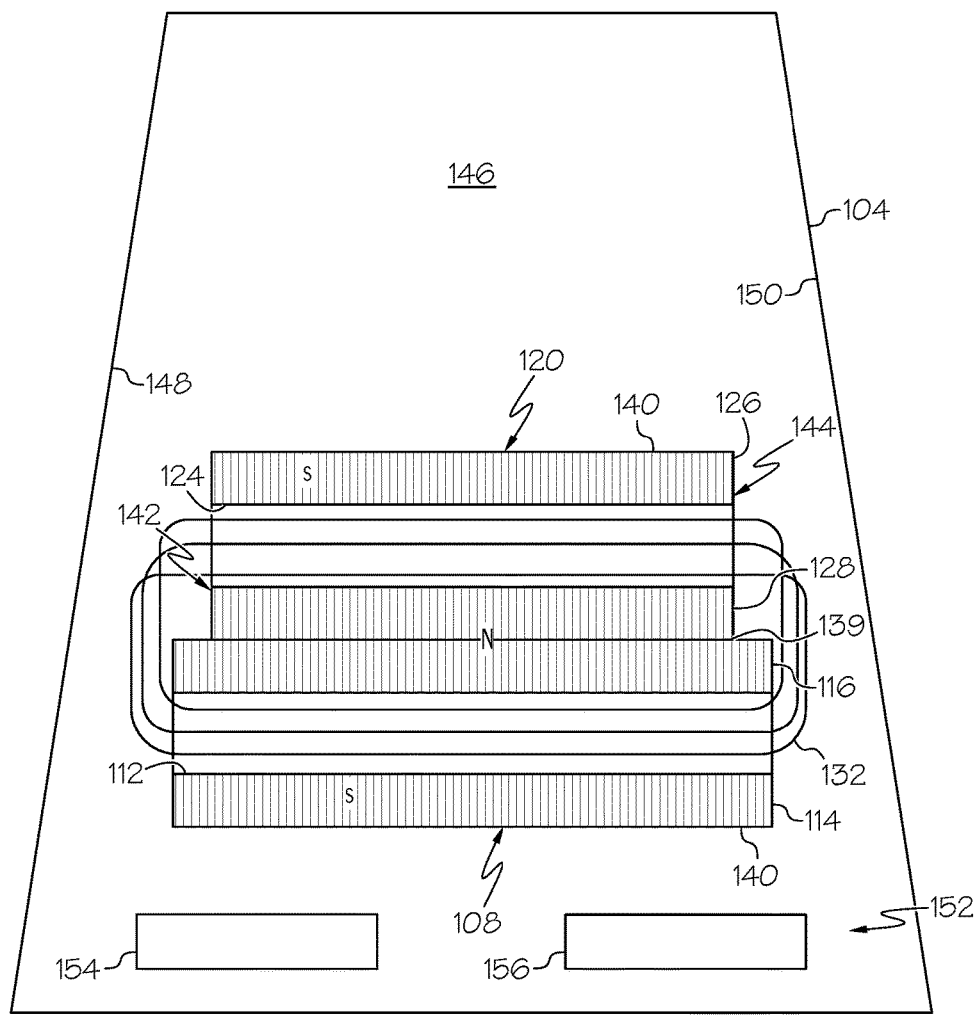
FIG. 2 is a detailed view of an example of a stator element in accordance with an embodiment of the present disclosure.
Figure 3A:
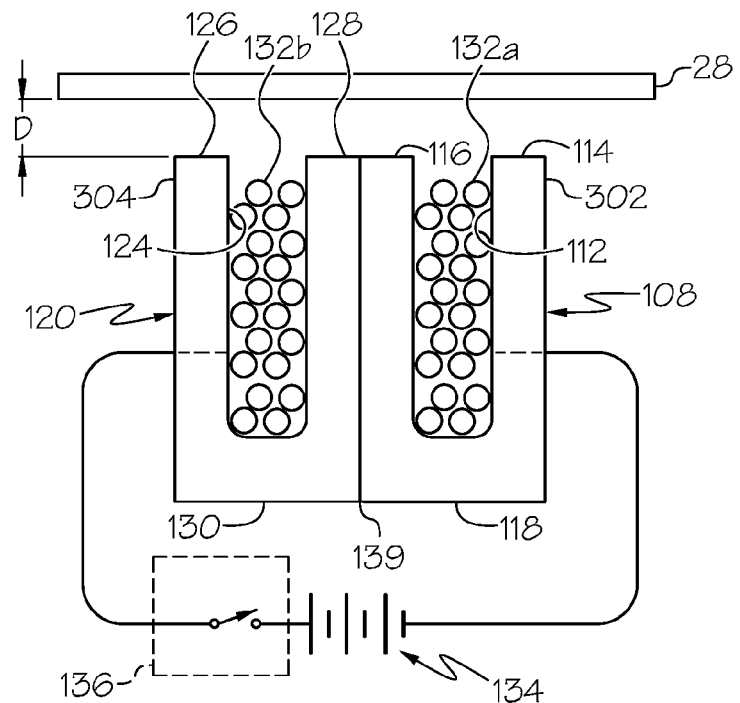
FIGS. 3A and 3B are each a side view of the exemplary stator element in FIG. 2 and a portion of a drive plate of an electric motor illustrating operation of the exemplary stator element in accordance with an embodiment of the present disclosure.
Figure 3B:
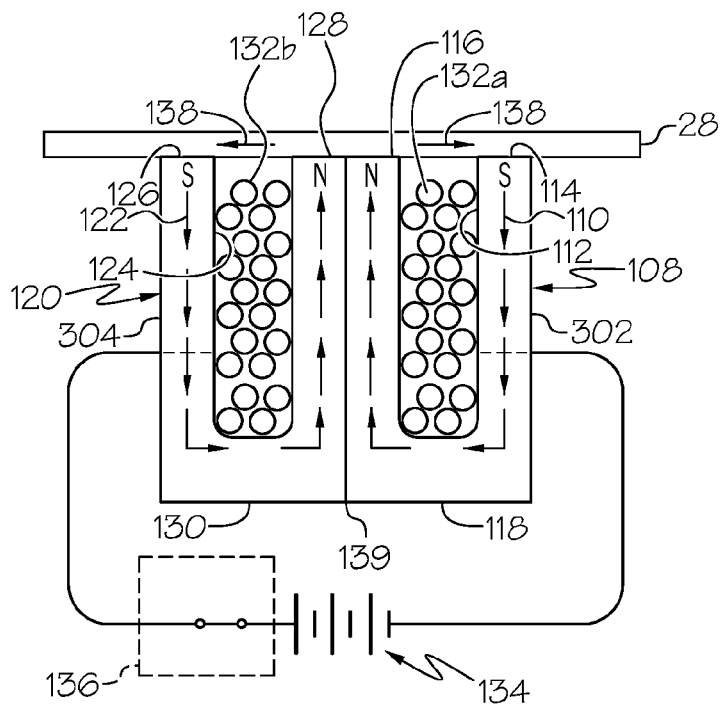

Referring also to FIG. 2 and FIGS. 3A and 3B, FIG. 2 is a detailed view of the exemplary stator element 104. FIGS. 3A and 3B are each a side view of the exemplary stator element 104 in FIG. 2 and a portion of the drive plate 28 of the electric motor 102 illustrating operation of the stator element 104 in accordance with an embodiment of the present disclosure. Each stator coil element 104 includes a first magnetic core 108 in which a first magnetic flux is generable. The first magnetic flux is illustrated flowing in the first magnetic core 108 by arrows 110 in FIG. 3B. A first core slot 112 is formed in the first magnetic core 108. As best shown in FIGS. 3A and 3B, the first magnetic core 108 includes two elongated members 114 and 116 joined at one end by a base member 118. The two elongated members 114 and 116 and the base member 118 are defined or formed by the first core slot 112. The two elongated members 114 and 116 extend from the base member 118 substantially parallel to each other toward the drive plate 28.

Each stator coil element 104 also includes a second magnetic core 120 in which a second magnetic flux is generable. The second magnetic flux is illustrated flowing in the second magnetic core 120 by arrows 122 in FIG. 3B. A second core slot 124 is formed in the second magnetic core 120. As best shown in FIGS. 3A and 3B, the second magnetic core 120 includes two elongated members 126 and 128 joined at one end by a base member 130. The two elongated members 126 and 128 and the base member 130 are defined or formed by the second core slot 124. The two elongated members 126 and 128 extend from the base member 130 substantially parallel to each other toward the drive plate 28.

Figure 10:
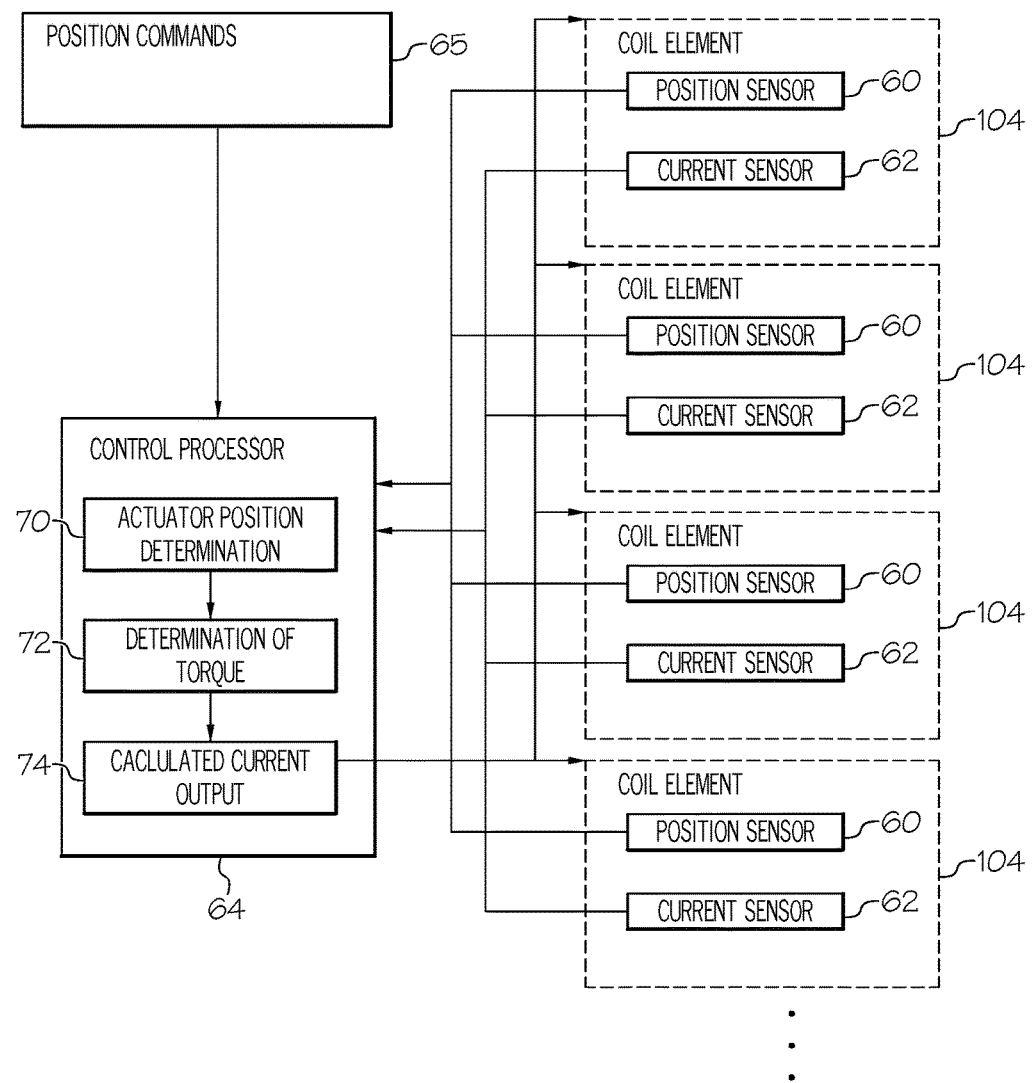
FIG. 10 is a block diagram of an example of actuator control elements in accordance with an embodiment of the present disclosure.

Each stator element 104 also includes a stator coil 132 wound through the first core slot 112 and the second core slot 124. The stator coil 132 is connectable to an electrical power source 134 for applying an electrical current to the stator coil 132. As described in more detail herein, a controller 136, illustrated by the switch mechanism in FIGS. 3A and 3B provide independent control to each stator element 104 for activation of a particular stator element 104 responsive to a received position command and a received wobble angle input to the controller 136. In accordance with an embodiment, the power source 134 and the controller 136 for each stator element 104 is embodied in a control processor 64 (FIG. 10). In another embodiment, the power source 134 is a separate component connected or coupled to the control processor 64. The plurality of coil elements 104 operate in a pure torque sum configuration upon the drive plate 28. An electrical current flowing in the stator coil 132 generates a magnetic field about the stator coil 132 that is absorbed by the first magnetic core 108 and the second magnetic core 120 to generate the first magnetic flux 110 and the second magnetic flux 122 flowing respectively in the first magnetic core 108 and the second magnetic core 120. The first magnetic flux 110 and the second magnetic flux magnetically attract the drive plate 28 as illustrated in FIG. 3B. The first magnetic core 108 and the second magnetic core 120 define electromagnets 302 and 304 that electromagnetically or magnetically attract the drive plate 28 or an associated core segment 30 of the drive plate 28. As illustrated in FIG. 3B, the drive plate 28 forms a magnetic flux path 138 with each of the first magnetic core 108 and the second magnetic core 120 in response to the drive plate 28 contacting the elongated members 114 and 116 of the first core 108 and the elongated members 126 and 128 of the second magnetic core 120.

As previously described, in accordance with an embodiment of the disclosure, each stator coil element 104 is associated with a respective one of the plurality core segments 30 (FIG. 8) of the drive plate 28. The associated core segment 30 of the drive plate 28 forms the magnetic flux path 138 with the first magnetic core 108 and the second magnetic core 120 of an associated stator coil element 104 in response to the associated core segment 30 contacting the elongated members 114 and 116 of the first magnetic core 108 and the elongated members 126 and 128 of the second core member 120.

Referring to FIG. 3A, the associated core segment 30 (not shown in FIGS. 3A and 3B) of the drive plate 28 is disposed at distance "D" from the first magnetic core 108 and the second magnetic core 120 of the associated stator core element 104 in response to the electrical current being removed from the stator coil 132 of the associated stator core element 104 and the electrical current being applied to another stator coil 132 of the plurality of stator coil elements 104. The distance D may vary based a received position command and a received wobble angle by the controller 136 for controlling movement or nutation of the drive plate 28 as described in more detail herein.

The direction of flow of the first magnetic flux 110 in the first magnetic core 108 and the second magnetic flux 122 in the second magnetic core 120 will depend on the direction of flow of the electrical current in the stator coil 132 and the right-hand rule convention. According to the right-hand rule, electrically current flowing into the page in the portion of the stator coil 132a through the first slot 112 and out of the page in the portion of the stator coil 132b through the second core slot 124 will cause the first magnetic flux 110 and the second magnetic flux 122 to flow in the direction illustrated by the arrows in FIG. 3B. The electrical current flowing in the opposite direction through the stator coil 132 will cause the first magnetic flux 110 and the second magnetic flux 122 to flow in the opposite direction to that illustrated by the arrows in FIG. 3B.

The first magnetic core 108 and the second magnetic core 120 abut one another along a respective one of the elongated members 116 and 128 of each of the first magnetic core 108 and the second magnetic core 120. The respective one of the elongated members 116 and 118 of each of the first magnetic core 108 and the second magnetic core 120 that abut one another define a North Pole (N) or a South Pole (S) of respective electromagnets 302, 304 corresponding to the first magnetic core 108 and the second magnetic core 120 based on a direction of flow of the electrical current in the stator coil 132. Another elongated member 114 and 126 or non-abutting elongated members 114 and 126 of each of the first magnetic core 108 and the second magnetic core 120 define an opposite of the North Pole (N) or the South Pole (S) from the respective ones of the elongated members 116 and 128 that abut one another. Based on the example illustrated in FIG. 3B with a direction of flow of the electrical current into the page in the portion of the stator coil 132a in the first core slot 112 and out of the page in the portion of the stator coil 132b in the second core slot 124, the abutting elongated members 116 and 128 respectively define the North Pole (N) and the other elongated members 114 and 126 or outer elongated members 114 and 116 define the South Poles (S) of the electromagnets 302, 304 defined by the first magnetic core 108 and the second magnetic core 120. These poles may be reversed by reversing the direction of current flow through the stator coil 132 and the magnetic flux 110 and 122 will flow in the opposite direction to that illustrated in the example of FIG. 3B.

In accordance with an embodiment, the stator assembly 100 includes a stator cavity 146 (FIG. 2). Each stator element 104 may be disposed in a stator cavity 146. The stator cavity 146 or stator cavities may be formed in the stator case 24. The first magnetic core 108, the second magnetic core 120 and the stator coil 132 are disposed in the stator cavity 146 and the drive plate 28 is disposed at a distance from the first magnetic core 108 and the second magnetic core 120 in response to the electrical current being removed from the stator coil 132 similar to that previously described with reference to FIG. 3A. In accordance with the embodiment illustrated in FIGS. 1 and 2, each stator cavity 146 and stator element 104 includes a substantially trapezoidal shape or pie-shape within the stator case 24 and the second magnetic core 120 includes a fewer number of plates 140 than the first magnetic core 108 and is shorter on opposite ends 142 and 144 than the first magnetic core 108. The first magnetic core 108, the second magnetic core 120 and the stator coil 132 are configured and sized to optimally or maximally occupy a space between side edges 148 and 150 of each stator cavity 146 without contacting the side edges 148 and 150 and to be circumferentially distributed in the stator case 24 as illustrated in the embodiment of FIG. 1.

Figure 4:
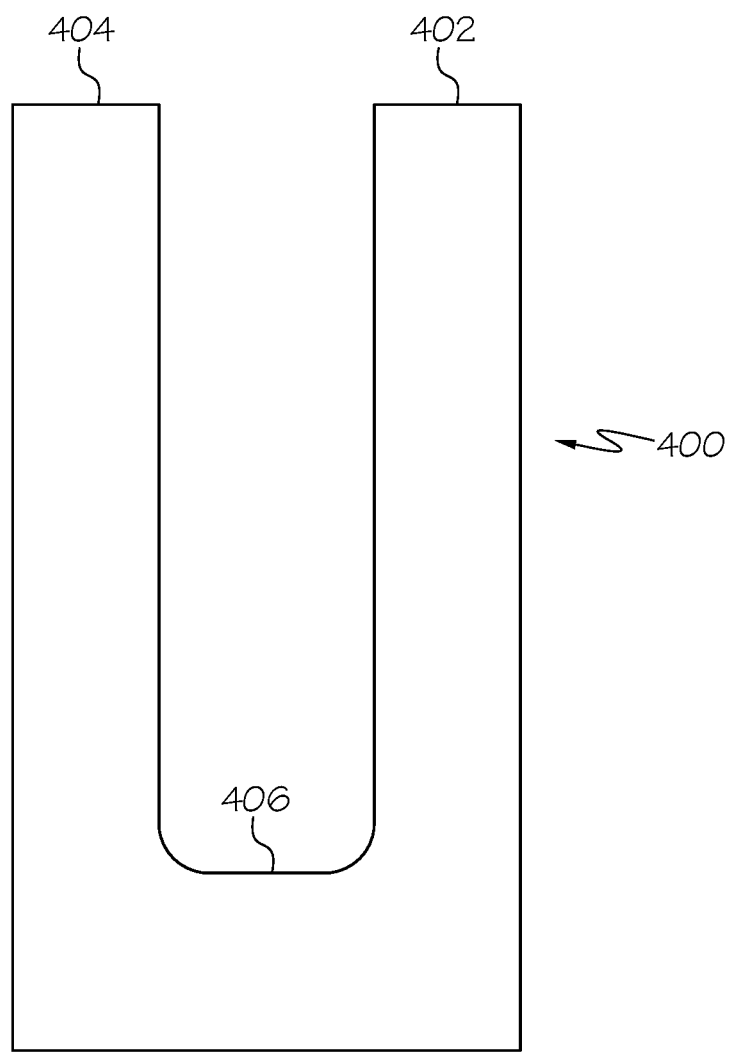
FIG. 4 is an example of a plate or laminate that may be used for each of the plates or laminates in FIGS. 1 and 2.

In accordance with an embodiment, the first magnetic core 108 and the second magnetic core 120 each include a plurality of plates 140 or laminates stacked directly on one another. Referring to FIG. 4, FIG. 4 is an example of a plate 400 or laminate that may be used for each of the plates 140. The plate 400 includes two elongated segments 402 and 404 joined at one end by a base segment 406. The plates 140 or 400 or laminates form the two elongated members 114, 116 and 126, 128 and the base member 118 and 130 of each of the first magnetic core 108 and the second magnetic core 120 when the plates 140 or 400 are stacked directly on one another as illustrated in the embodiment of FIGS. 1 and 2. The first magnetic core 108 and the second magnetic core 120 including the plurality of plates 140, 400 or laminates eliminates eddy currents that reduce the efficiency of the magnetic cores 108 and 120

In accordance with the embodiment illustrated in FIG. 2, the second magnetic core 120 includes a fewer number of plates 140 than the first magnetic core 108 and is shorter on opposite ends 142 and 144 than the first magnetic core 108 to more efficiently occupy the available space within the substantially trapezoidal shaped or pie-shaped stator cavity 146. As previously described, the first magnetic core 108 and the second magnetic core 120 and stator coil 132 are configured to closely fit within the stator cavity 146 without contacting the side edges 148 and 150. This provides more magnetic core volume for reception of magnetic flux and more wire of the stator coil 132 is wound within the first magnetic core 108 and the second magnetic core 120 for generating magnetic flux within the magnetic cores 108 and 120 for more efficient operation. In accordance with another embodiment, the second magnetic core 120 and the first magnetic core 108 have an equal number of plates 140 and are the same length. However, the first magnetic core 108 and the second magnetic core 120 will not occupy substantially the entire available space within the trapezoidal shaped or pie-shaped stator cavity 146 and the first magnetic core 108 will have a smaller magnetic core volume for reception of magnetic flux and less wire of the stator coil 132 wound through the first magnetic core 108 resulting in less efficient operation. A reduced amount of magnetic pull or strength will be generated for attracting the drive plate 28 if the first magnetic core 108 is shorter.

In accordance with another embodiment, the first magnetic core 108 and the second magnetic core 120 may be integrally formed. The first magnetic core 108 and the second magnetic core 120 may be integrally formed by integrally forming the abutting elongated members 116 and 128 of the first and second magnetic cores 108 and 120 respectively. However, eddy currents may be generated in the integrally formed magnetic core that reduces the efficiency of the magnetic core. Additionally, an integrally formed magnetic core may not fit as closely within the stator cavity 146 resulting in less magnetic core volume for reception of magnetic flux and less wire wound within the magnetic core resulting in a less efficient stator core element 104. With the first magnetic core 108 and the second magnetic core 120 being separate, an air gap 139, while quite small, exists between the abutting elongated members 116 and 128 of the first magnetic core 108 and the second magnetic core 120 which keeps the first magnetic flux 110 and the second magnetic flux 122 separate and better defines the magnetic flux paths.

Figure 5:
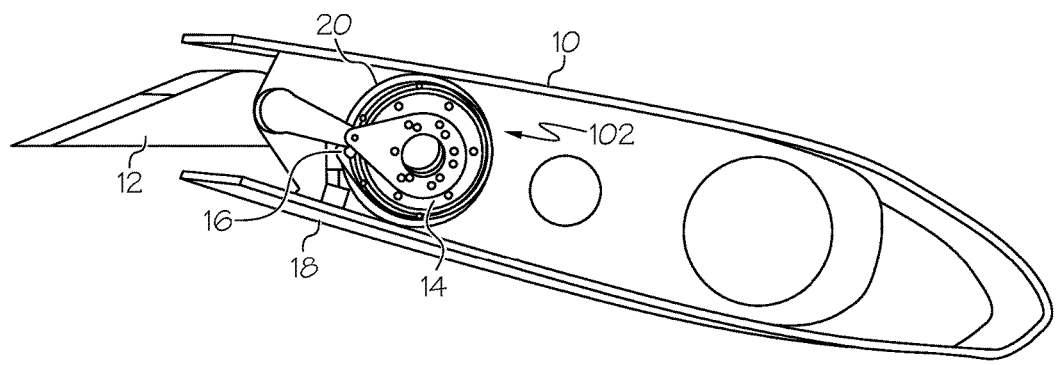
FIG. 5 is an isometric cut away view of an exemplary aerodynamic surface actuator according to an embodiment of the present disclosure incorporated in a wing.

Referring to FIG. 5, FIG. 5 shows an aircraft wing 10 having an aerodynamic surface 12 such as an aileron, spoiler or flap providing an aircraft control surface system. An actuator 14 according to the embodiments described herein has a stationary connection 16 to a stationary structure such as wing structural element 18 for reaction of the actuation forces. A drive connection 20 is attached to actuating elements of the aerodynamic surface 12. In accordance with an embodiment, the controller 136 controls activation of the stator coils elements 104 to position the aerodynamic surface 12 of an aircraft.

Figure 6:
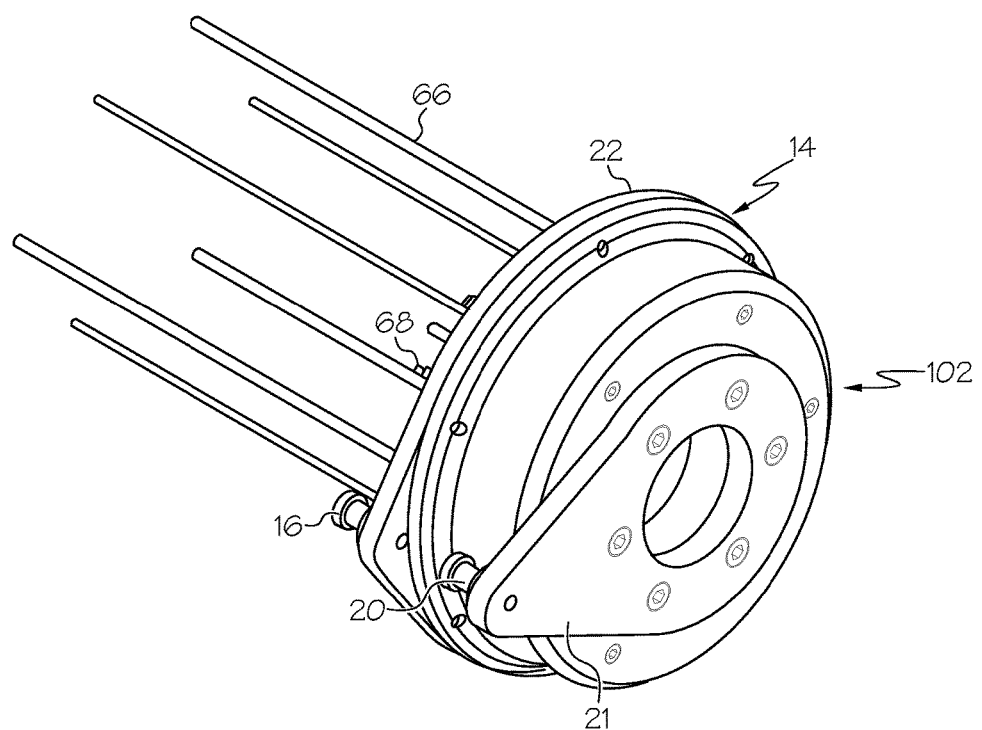
FIG. 6 is a detailed view of the exemplary actuator in FIG. 5.
Figure 7:
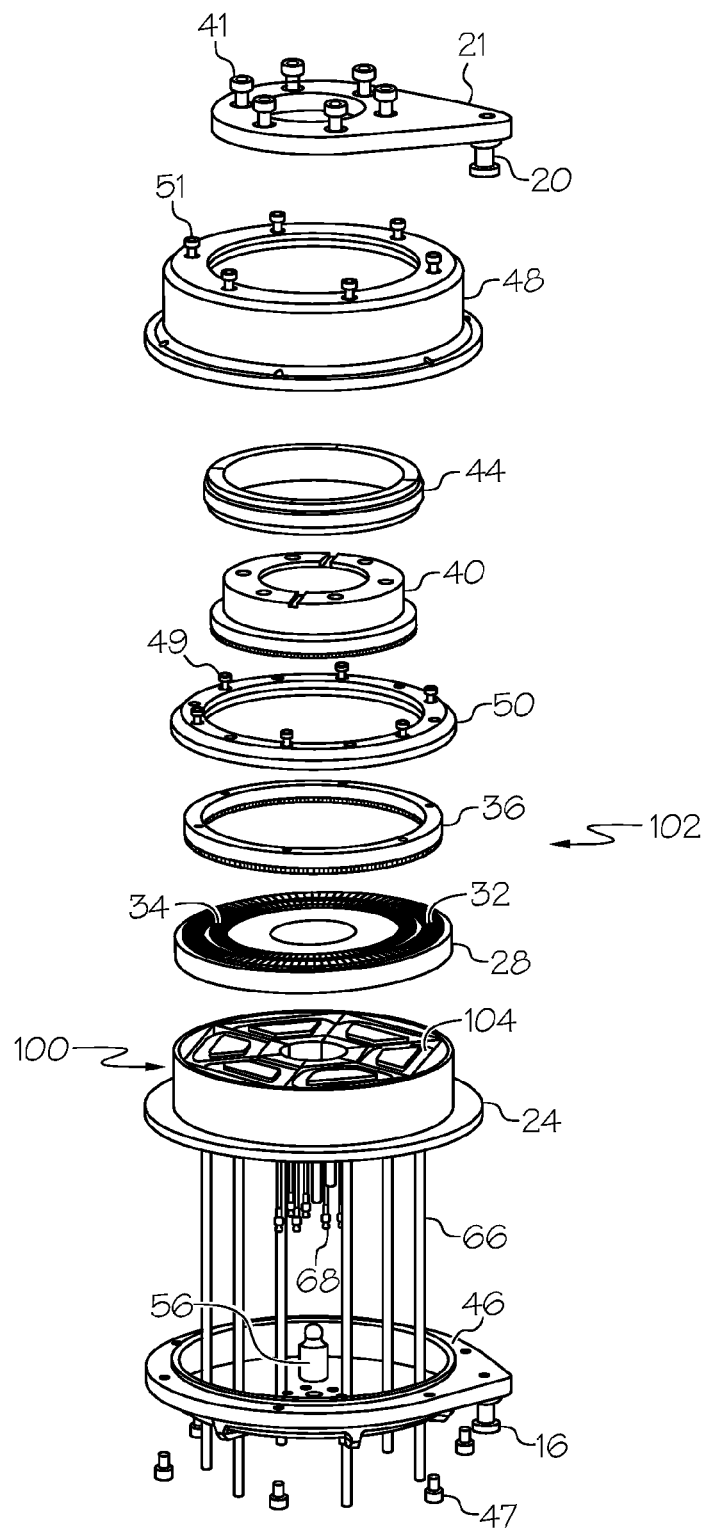
FIG. 7 is an exploded view of the exemplary actuator in FIGS. 5 and 6 in a first perspective demonstrating the elements of an example of an electric motor.

An example of the actuator 14 is shown in detail in FIG. 6. Stationary connection 16 extends directly from a case 22 for the actuator 14. Drive connection 20 extends from a rotational flange 21. For the embodiments shown, stationary connection 16 and drive connection 20 are shown as cylindrical end elements to be received in monoball bearings in actuating rods. In alternative embodiments, other connection arrangements such as rod ends or flanges directly connected to the rotational flange 21 or a rotational output plate, to be described in greater detail subsequently, and actuator case 22 may be employed.

Figure 8:
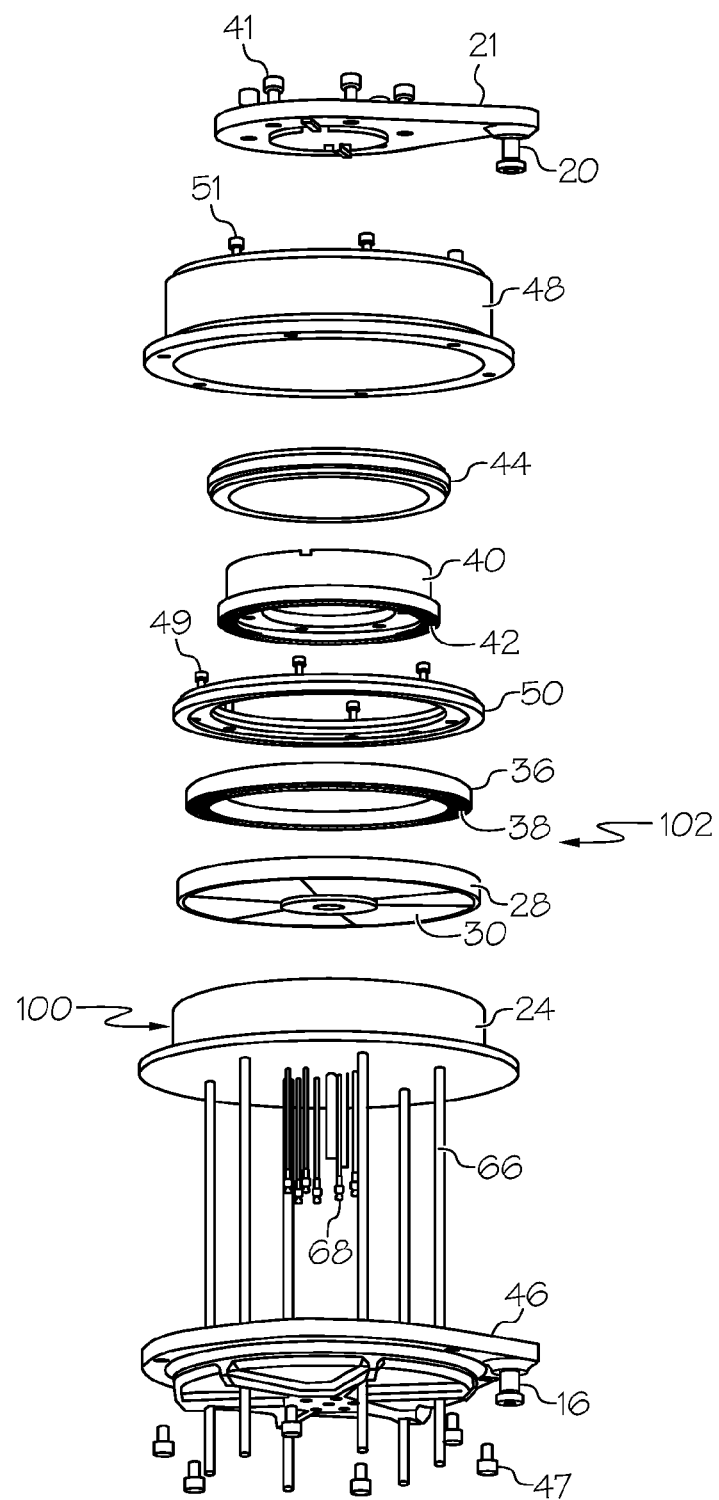
FIG. 8 is an exploded view of the exemplary actuator in FIGS. 5 and 6 in a second perspective.
Figure 9A:
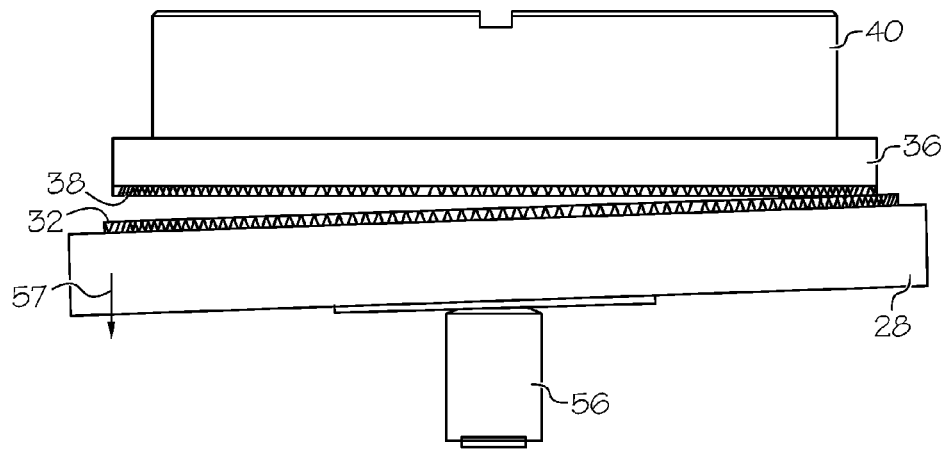
FIG. 9A is a side view of engagement of gears of an exemplary drive plate and gears of an exemplary reaction gear plate in accordance with an embodiment of the present disclosure.
Figure 9B:
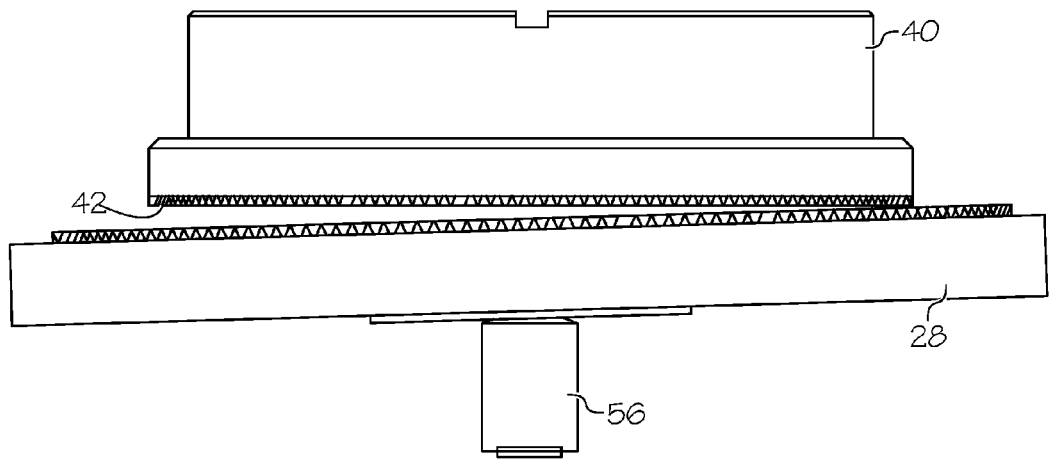
FIG. 9B is a side view of the engagement of gears of an exemplary drive plate and gears of an exemplary output plate with the reaction gear plate removed for clarity.

As shown in the exploded views of FIGS. 7 and 8, the exemplary actuator 14 incorporates an electric motor 102. The electric motor 102 in the embodiment shown in FIGS. 7 and 8 is configured as a virtual elliptical electric motor including a stator assembly 100 similar to that previously described. The stator assembly 100 includes a stator case 24 supporting multiple stator coil elements 104 similar to the embodiment previously described with reference to FIGS. 1-4. For the embodiment shown, six stator coil elements 104 are shown however any number greater than four may be employed in alternative embodiments. A drive plate 28 includes matching core segments 30 (seen in FIG. 8) that correspond to the stator coil elements 104. The core elements 30 divide the drive plate 28 into sectors, each sector is associated with a stator coil element 104. The drive plate 28 additionally has an outer pericyclic gear ring 32 proximate an outer circumference of the drive plate 28 and an inner pericyclic gear ring 34 radially inward from the outer pericyclic gear ring 32. A stationary or reaction gear plate 36 incorporates reaction pericyclic gear ring 38 (seen in FIG. 8) to matingly engage the outer pericyclic gear ring 32 on the drive plate 28. A rotational output plate 40 incorporates a rotational drive pericyclic gear ring 42 (seen in FIG. 8) to engage the inner pericyclic gear ring 34 on the drive plate 28. A bushing 44 supports the rotational output plate 40. The electric motor 102 or virtual elliptical electric motor is supported in the actuator case 22 which has a base 46 in which the stator case 24 is received. A cover 48 attaches to the base 46 with bolts 47 and supports the bushing 44. A reaction ring 50 engages the reaction gear plate 36 to the cover 48 with bolts 49 and 51 respectively. Rotational flange 21 attaches to the rotational output plate 40 with bolts 41.

Details of an example of the stator case 24 and stator coil elements 104 were described with reference to FIGS. 1-4. Unlike conventional electric motors, the actuating coil or stator coil 132 of each exemplary stator coil element 104 are associated with first and second magnetic cores 108 and 120 that are stationary. As previously described, upon activation of the stator coil 132 by introduction of an electrical current, stator core 132 attracts corresponding matching core segment 30 on the drive plate 28. The drive plate 28 is supported by a fulcrum 56, seen in FIGS. 9A and 9B, as a wobble plate and nutates on the fulcrum 56 with sequential activation of the stator coils 132 (FIG. 1). During operation, a first matching core segment 30 (seen in FIG. 8) in the drive plate 28 is electromagnetically pulled to the associated stator coil element 104 (FIGS. 1, 3B and 7) as indicated by arrow 57 (as shown in FIG. 9A), and the diametrically opposite portion of the drive plate 28 is pushed against the reaction gear plate 36 and the rotational output plate 40 with engagement of the associated portions of the outer and inner pericyclic gear rings 32 and 34 (seen in FIG. 7) by the reaction pericyclic gear ring 38 and the drive pericyclic gear ring 42 (seen in FIG. 8), respectively. Sequentially activating the stator coils 132 causes the drive plate 28 to nutate on the fulcrum 56. The nature of pericyclic gears provides relative motion in the rising gears radially inward while descending gears move radially outward. Sequentially engaging and driving the inner pericyclic gear ring 34 of the drive plate 28 against the rotational pericyclic gear 42 on the rotational output plate 40 drives the rotational output plate 40 to rotate as the drive plate 28 nutates about the fulcrum 56. Reaction of the rotational motion to the actuator case 22 (formed by base 46 and cover 48) is provided by the outer pericyclic gear ring 32 of the drive plate 28 engaging the reaction pericyclic gear ring 38 on the reaction gear plate 36. In an exemplary embodiment with 180 teeth on the outer and reaction pericyclic gears and 179 teeth on the inner and drive pericyclic gears, a gear ratio of 180 to 1 is achieved allowing very precise control with high mechanical advantage for the produced torque.

Control of the electric motor 102 or virtual elliptical electric motor is accomplished by measuring the wobble angle of the drive plate 28 employing one or more position sensors and activating stator coil elements 104 responsive to a commanded torque. Each stator coil element 104 is commanded independently of all other stator coil elements 104. As shown in FIG. 10, a position sensor 60 and a current sensor 62 are associated with each coil element 104 (for the embodiment shown in the drawings six position sensors and six current sensors). In alternative embodiments a minimum of two position sensors, for example eddy current probes available from MICRO-EPSILON MESSTECHNIK GmbH & Co. KG, Ortenburg, Germany, spaced at 90 degrees or 120 degrees may be employed to provide a fully determinant calculation of the wobble angle. A control processor 64 receives position commands 65 for the actuator 14 from a flight control computer or similar command device and input from the position sensors 60 and current sensors 62. Control processor 64 incorporates programmed software modules to determine current actuator position based on wobble angle 70 or a wobble angle input, and determine a torque command 72 required to rotate the drive plate 28 from the current position to a desired position based on the received position commands. A calculated current output 74 is sequentially applied through cables 66 (FIGS. 7 and 8) to each stator coil element 104 for activation resulting in nutation of the drive plate 28 to the desired position. Through feedback from the position sensors 60 provided through attachment cables 68 (FIGS. 7 and 8), electrical current in the activated stator coil element 104 is controlled by the control processor 64 to achieve the desired position change with respect to that stator coil element 104 and position as determined by the position sensors 60 without reference to other stator coil elements 104. Consequently, failure of a stator coil element 104 or the controller 136 (FIGS. 3A and 3B) for that stator coil element 104 does not impede operation of the electric motor 102 since additional current is applied to adjacent stator coil elements 104 for desired position change. The stator coil elements 104 operate in a pure torque sum to provide the nutation of drive plate 28. In accordance with an embodiment, the controller 136 for each stator coil element 104 is embodied in the control processor 64.

Figure 11:
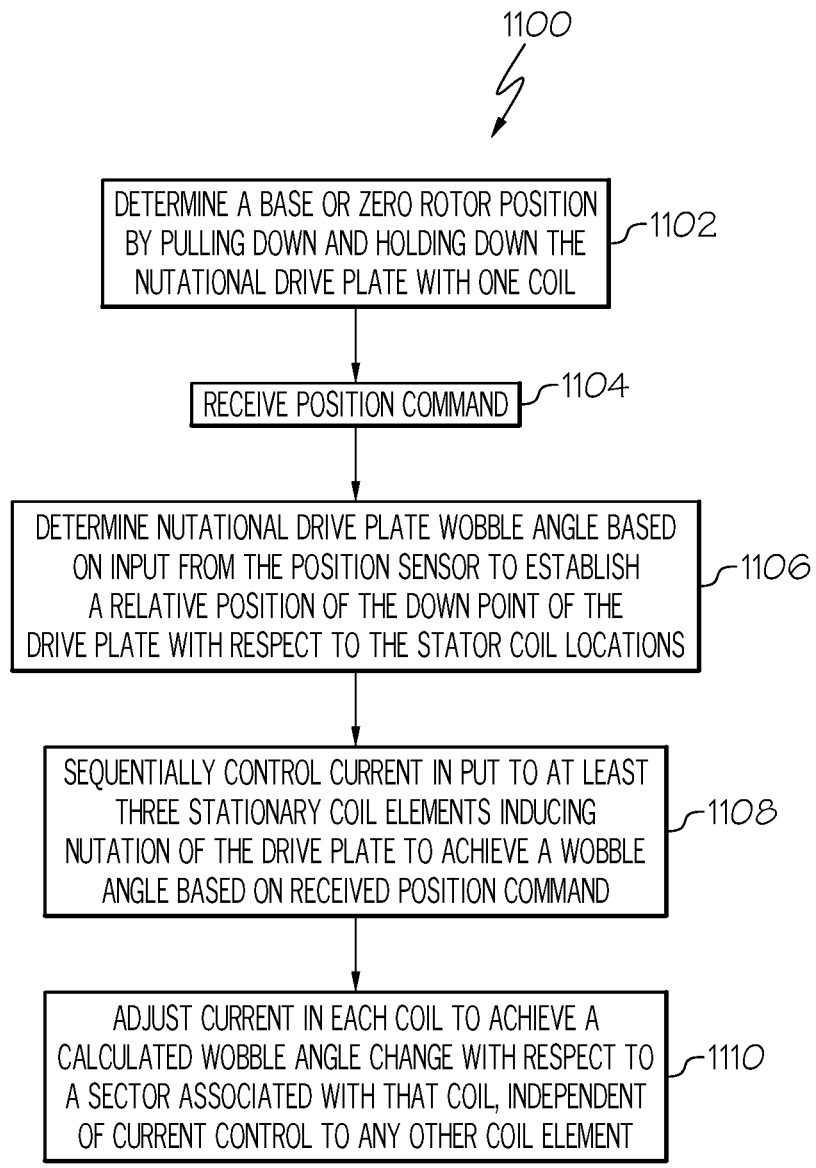
FIG. 11 is a flow chart of an example of a method for operation of a control processor or controller for control of an electric motor or virtual elliptical electric motor actuator in accordance with an embodiment of the present disclosure.

Referring to FIG. 11, FIG. 11 is a flow chart of an example of a method 1100 for operation of a control processor or controller for control of an electric motor or virtual elliptical electric motor actuator in accordance with an embodiment of the present disclosure. In accordance with an embodiment, the method 1100 is embodied in and performed by the control processor 64 in FIG. 10 for controlling the electric motor 102 or virtual elliptical electric motor actuator 14. In block 1102, a base or zero rotor position is determined by pulling down and holding down the nutational drive plate. The drive plate must be in a known and valid position in order for the stator assembly to apply forces to the drive plate in a known and regular way. At least one stator coil is energized to pull the drive plate until the drive plate is at the maximum tilt angle with respect to that coil (full down). Measurement of position by the position sensors then establishes a zero position.

In block 1104, a position command is received. In block 1106, a nutational drive plate wobble angle is determined by the control processor based on input from the position sensor to establish a relative position of the down point of the drive plate with respect to the stator coil locations.

In block 1108, electrical current input is sequentially controlled by the control processor for application of electrical current to at least three of a plurality of at least five stationary stator coil elements inducing nutation of the drive plate to achieve a wobble angle consistent with the received position command. Application of current to the stator coils is determined as a force vector application. Using the position measurements, a combination of electrical current magnitudes are applied to all the stator coils. The forces generated by these electrical currents, through magnetic attraction, sum as vectors on the rotor to create the desired hold down and torque. These vectors are independent of each other and can only apply force at their stator location. There is only a need for three vectors spaced at greater than 90 degrees apart to provide full control of the rotor. These currents are modulated as the rotor moves through its cycle. Current may be sequentially applied to all of the coil elements if they are operational.

In block 1110, electrical current is adjusted in each stator coil to achieve a calculated wobble angle change with respect to a sector associated with that stator coil, independent of current control to any other coil element (current adjustment independent of current control). In any configurations of stator coils of five or greater, any single stator coil failure and any dual failure of non-adjacent stator coils results in at least three remaining stator coils spaced from one another by less than 160 degrees. For larger numbers of stator coils, multiple stator coil failures may be accommodated as long as at least three coils remain with angles between the remaining coils of less than 160 degrees between any two of the three stator coils.

In one exemplary embodiment six coils and six rotor core segments provide two independent sets of three coils (three coil elements) each spaced 120 degrees apart around the stator assembly with each of the stator coils of the first set intermediate two of the stator coils of the second set. Using the position measurements a combination of electrical current magnitudes are applied to each set of stator coils. The forces generated by these electrical currents, through magnetic attraction, sum as vectors on the rotor or drive plate to create the desired hold down and torque. These electrical currents are modulated as the rotor or drive plate moves through its cycle. Because all forces are independent, the two sets of three phase currents scale to the torque command modified by the relative rotor or drive plate position. The magnitude of vector sum of the electrical currents is controlled by the motor controller in response to some error (i.e. position, speed, acceleration). If all stator coils and/or controllers are active the individual stator coils will have an average electrical current over the entire cycle or wobble of the rotor or drive plate. When one or more stator coils are lost, that set of three stator coils that lost the stator coil is de-energized, the vector sum needed to produce the desired force must remain the same so the average electrical current in the remaining stator coils are simply increased by a factor of 1.7 to compensate for the loss. No other change is required.

To further accommodate failures of stator coil elements 104, permanent magnets 152, each including opposite poles 154 and 156, may be associated with each stator coil element 104 as shown in FIGS. 1 and 2 to provide additional magnetic hold down force for the core segments 30 of the drive plate 28. The nutating drive plate 28 will place each core segment 30 proximate the associated permanent magnet 152 sequentially and the permanent magnet 152 will provide attractive force for the core segment 30 in the drive plate 28, even if the associated stator coil 132 is not energized for magnetization of the stationary first and second magnetic cores 108 and 120, thereby counteracting any tendency of the gear reaction to lift the drive plate 28 over an inactive stator coil 132. This enhances the capability of the drive plate 28 to wobble through the sector of the failed stator coil 132 or failed stator coil element 104. In the exemplary embodiment shown, the permanent magnets 152 are located proximate a peripheral circumference of the stator case 24 for close contact with the nutating periphery of the drive plate 28. In accordance with another example, only a single pole of the permanent magnet 152 may be used to attract the drive plate 28 depending upon an appropriate amount of magnetic strength needed for nutation of the drive plate 28.

By providing at least five stator coil elements with associated stator coils and stationary magnetic cores to attract associated core segments in the drive plate, failure of one coil element with not affect operation of the virtual elliptical electric motor. Oversizing of the electrical current capacity by 70% in a six coil system operating in two sets of three as previously described allows stator coil sets to receive sufficient electrical current to overdrive the nutation of the drive plate through the sector associated with the inoperative stator coil element. Each additional stator coil element incorporated in the system will provide capability to tolerate an additional nonadjacent failed stator coil element in the electric motor. The exemplary six stator coil element configuration of the embodiment as described herein when operating with all six stator coils independently controlled will accommodate failure of three non-adjacent stator coils or two adjacent stator coils without impact to operation of the electric motor.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of the examples and embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A stator assembly for an electric motor, comprising:
a drive plate;
a first magnetic core in which a first magnetic flux is generable;
a first core slot formed in the first magnetic core, wherein the first magnetic core comprises two elongated members joined at only one end by a base member, the two elongated members and the base member are defined by the first core slot, and the two elongated members extend from the base member substantially parallel to each other toward the drive plate;
a second magnetic core in which a second magnetic flux is generable;
a second core slot formed in the second magnetic core, wherein the second magnetic core comprises two elongated members joined at only one end by a base member, the two elongated members and the base member are defined by the second core slot, and the two elongated members extend from the base member substantially parallel to each other toward the drive plate, wherein the first magnetic core and the second magnetic core abut one another along a respective one of the elongated members of each of the first magnetic core and the second magnetic core and wherein the stator assembly is cylindrically shaped and the first core slot and the second core slot extend perpendicular to a radius of the cylindrically shaped stator assembly and the first core slot and the second core slot extend parallel to one another and are spaced radially from one another and from a center of the stator assembly; and
a stator coil wound through the first core slot and the second core slot and around the abutting elongated members of the first magnetic core and the second magnetic core, wherein an electrical current flowing in the stator coil generates a magnetic field about the stator coil that is absorbed by the first magnetic core and the second magnetic core to generate the first magnetic flux and the second magnetic flux that magnetically attract the drive plate.

2. The stator assembly of claim 1, wherein the drive plate forms a magnetic flux path with each of the first magnetic core and the second magnetic core in response to the drive plate contacting the elongated members of the first magnetic core and the second magnetic core.

3. The stator assembly of claim 1, wherein the respective one of the elongated members of each of the first magnetic core and the second magnetic core that abut one another define a north pole or a south pole of respective electromagnets corresponding to the first magnetic core and the second magnetic core based on a direction of flow of the electrical current in the stator coil, and another elongated member of each of the first magnetic core and the second magnetic core define an opposite of the north pole or the south pole from the respective one of the elongated members that abut one another.

4. The stator assembly of claim 1, wherein the first magnetic core and the second magnetic core each comprise a plurality of plates or laminates stacked directly on one another, each plate or laminate comprising two elongated segments joined at only one end by a base segment, wherein the plates or laminates form the two elongated members and the base member of each of the first magnetic core and the second magnetic core when stacked directly on one another.

5. The stator assembly of claim 4, wherein the second magnetic core comprises a fewer number of plates than the first magnetic core and is shorter on opposite ends than the first magnetic core.

6. The stator assembly of claim 5, further comprising a stator cavity, wherein the first magnetic core, the second magnetic core and the stator coil are disposed in the stator cavity and the drive plate is disposed at a distance from the first magnetic core and the second magnetic core in response to the electrical current being removed from the stator coil.

7. The stator assembly for an electric motor of claim 1, wherein the second magnetic core is shorter than the first magnetic core in a longitudinal direction of the first core slot and the second core slot, and the first magnetic core and the second magnetic core are sized to maximally occupy a space within a substantially trapezoidal shaped stator coil element.

8. The stator assembly for an electric motor of claim 1, further comprising a permanent magnet proximate the first magnetic core.

9. An electric motor, comprising:
a drive plate comprising a plurality of core segments;
a fulcrum supporting the drive plate for nutating motion of the drive plate;
a stator assembly comprising a plurality of stator coil elements, each stator coil element being associated with a respective one of the plurality of core segments and each stator coil element comprising:
a first magnetic core in which a first magnetic flux is generable;
a first core slot formed in the first magnetic core, wherein the first magnetic core comprises two elongated members joined at only one end by a base member, the two elongated members and the base member are defined by the first core slot, and the two elongated members extend from the base member substantially parallel to each other toward the drive plate;
a second magnetic core in which a second magnetic flux is generable;
a second core slot formed in the second magnetic core, wherein the second magnetic core comprises two elongated members joined at only one end by a base member, the two elongated members and the base member are defined by the second core slot, and the two elongated members extend from the base member substantially parallel to each other toward the drive plate, wherein the first magnetic core and the second magnetic core abut one another along a respective one of the elongated members of each of the first magnetic core and the second magnetic core and wherein the stator assembly is cylindrically shaped and the first core slot and the second core slot extend perpendicular to a radius of the cylindrically shaped stator assembly and the first core slot and the second core slot extend parallel to one another and are spaced radially from one another and from a center of the stator assembly; and a stator coil wound through the first core slot and the second core slot and around the abutting elongated members of the first magnetic core and the second magnetic core, wherein an electrical current flowing in the stator coil generates a magnetic field about the stator coil that is absorbed by the first magnetic core and the second magnetic core to generate the first magnetic flux and the second magnetic flux that magnetically attract the drive plate.

10. The electric motor of claim 9, wherein the associated core segment of the drive plate form a magnetic flux path with the first magnetic core and the second magnetic core of an associated stator coil element in response to the associated core segment contacting the elongated members of the first magnetic core and the second magnetic core.

11. The electric motor of claim 10, wherein the associated core segment of the drive plate is disposed at distance from the first magnetic core and the second magnetic core of the associated stator core element in response to the electrical current being removed from the stator coil of the associated stator core element and the electrical current being applied to another stator coil of the plurality of stator coil elements.

12. The electric motor of claim 9, wherein the first magnetic core and the second magnetic core are integrally formed by joining abutting elongated members of the first magnetic core and the second magnetic core.

13. The electric motor of claim 9, wherein the first magnetic core and the second magnetic core each comprise a plurality of plates or laminates stacked directly on one another, each plate or laminate comprising two elongated segments joined at only one end by a base segment, wherein the plates or laminates form the two elongated members and the base member of each of the first magnetic core and the second magnetic core when stacked directly on one another.

14. The electric motor of claim 13, further comprising a stator case, wherein the stator case is cylindrically shaped and the plurality of stator elements are disposed circumferentially within the stator case.

15. The electric motor of claim 14, wherein each stator element comprises a substantially trapezoidal shape within the stator case and the second magnetic core comprises a fewer number of plates than the first magnetic core and is shorter on opposite ends than the first magnetic core.

16. The electric motor of claim 9, further comprising a controller that provides independent control to each stator coil element for activation responsive to a received position command and a received wobble angle input, the plurality of stator coil elements operating a pure torque sum configuration upon the drive plate.

17. The electric motor of claim 16, wherein the controller controls activation of the stator coil elements to position an aerodynamic surface of an aircraft.

18. The electric motor of claim 9, wherein the drive plate comprises an outer pericyclic gear and an inner pericyclic gear, and further comprising:

a reaction plate including a reaction pericyclic gear configured for mating engagement of the outer pericyclic gear; and a drive plate including a drive pericyclic gear configured for mating engagement of the inner pericyclic gear.

19. A method for controlling an actuator, comprising receiving a position command;

determining a wobble angle of a drive plate mounted on a fulcrum; and sequentially controlling current to a plurality of stator coil elements of a stator assembly to attract associated core segments in the drive plate inducing nutation of the drive plate to achieve a wobble angle consistent with the received position command, wherein each of the plurality of stator coil elements comprise:

a first magnetic core in which a first magnetic flux is generable;

a first core slot formed in the first magnetic core, wherein the first magnetic core comprises two elongated members joined at only one end by a base member, the two elongated members and the base member are defined by the first core slot, the two elongated members extend from the base member substantially parallel to each other toward the drive plate;

a second magnetic core in which a second magnetic flux is generable;

a second core slot formed in the second magnetic core, wherein the second magnetic core comprises two elongated members joined at only one end by a base member, the two elongated members and the base member are defined by the second core slot, and the two elongated members extend from the base member substantially parallel to each other toward the drive plate, wherein the first magnetic core and the second magnetic core abut one another along a respective one of the elongated members of each of the first magnetic core and the second magnetic core and wherein the stator assembly is cylindrically shaped and the first core slot and the second core slot extend perpendicular to a radius of the cylindrically shaped stator assembly and the first core slot and the second core slot extend parallel to one another and are spaced radially from one another and from a center of the stator assembly; and a stator coil wound through the first core slot and the second core slot and around the abutting elongated members of the first magnetic core and the second magnetic core, wherein an electrical current flowing in the stator coil generates a magnetic field about the stator coil that is absorbed by the first magnetic core and the second magnetic core to generate the first magnetic flux and the second magnetic flux that magnetically attract the drive plate.

20. The method of claim 19, wherein sequentially controlling current includes adjusting current in each stator coil to achieve a calculated wobble angle change with respect to a sector associated with that stator coil, the current adjustment being independent of current control to any other stator coil element.

* * * * *